Nov. 16, 1948.　　　　　L. MYERS　　　　　2,454,256
JUICE EXTRACTOR
Filed Jan. 11, 1945　　　　　　　　　　　3 Sheets-Sheet 1
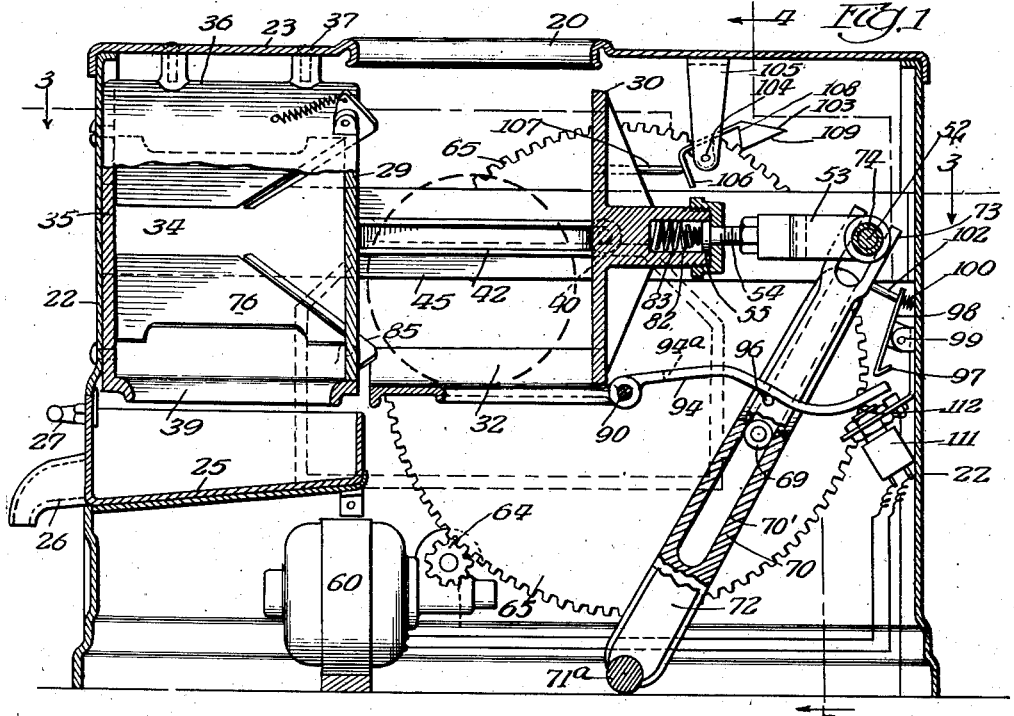
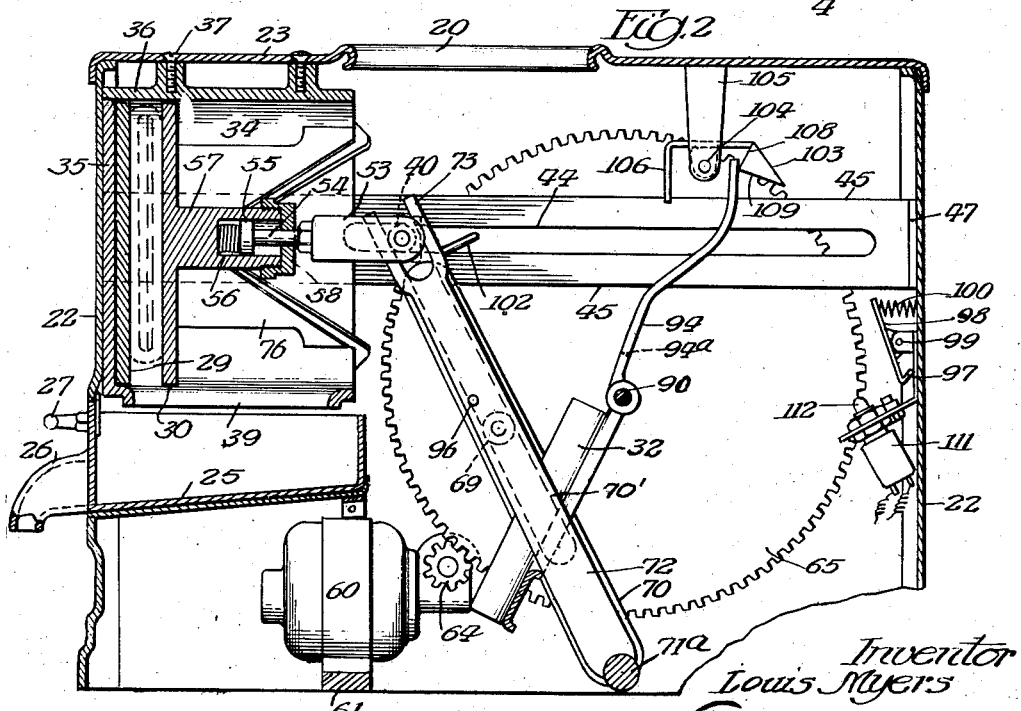
Inventor
Louis Myers
By Fred Gerlach
his Atty Nov. 16, 1948.                L. MYERS                2,454,256
                            JUICE EXTRACTOR
Filed Jan. 11, 1945                              3 Sheets-Sheet 2
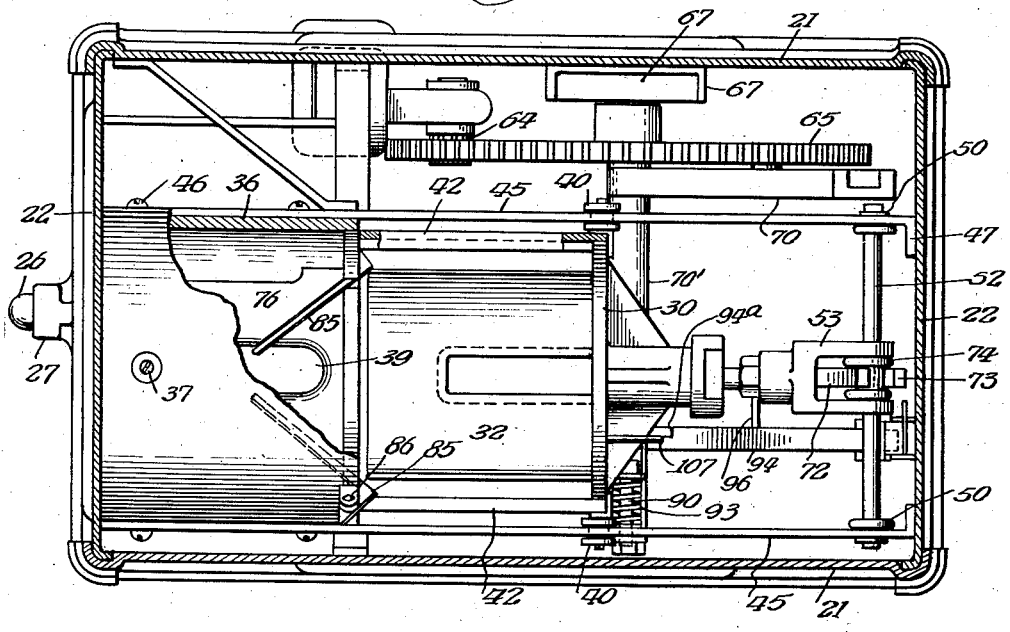
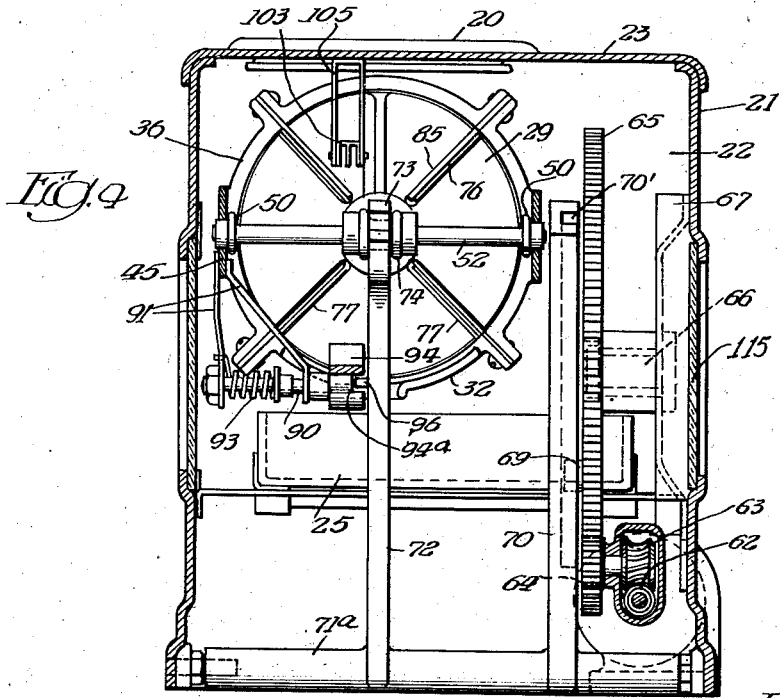
Inventor
Louis Myers
By Fred Gerlach his Atty.

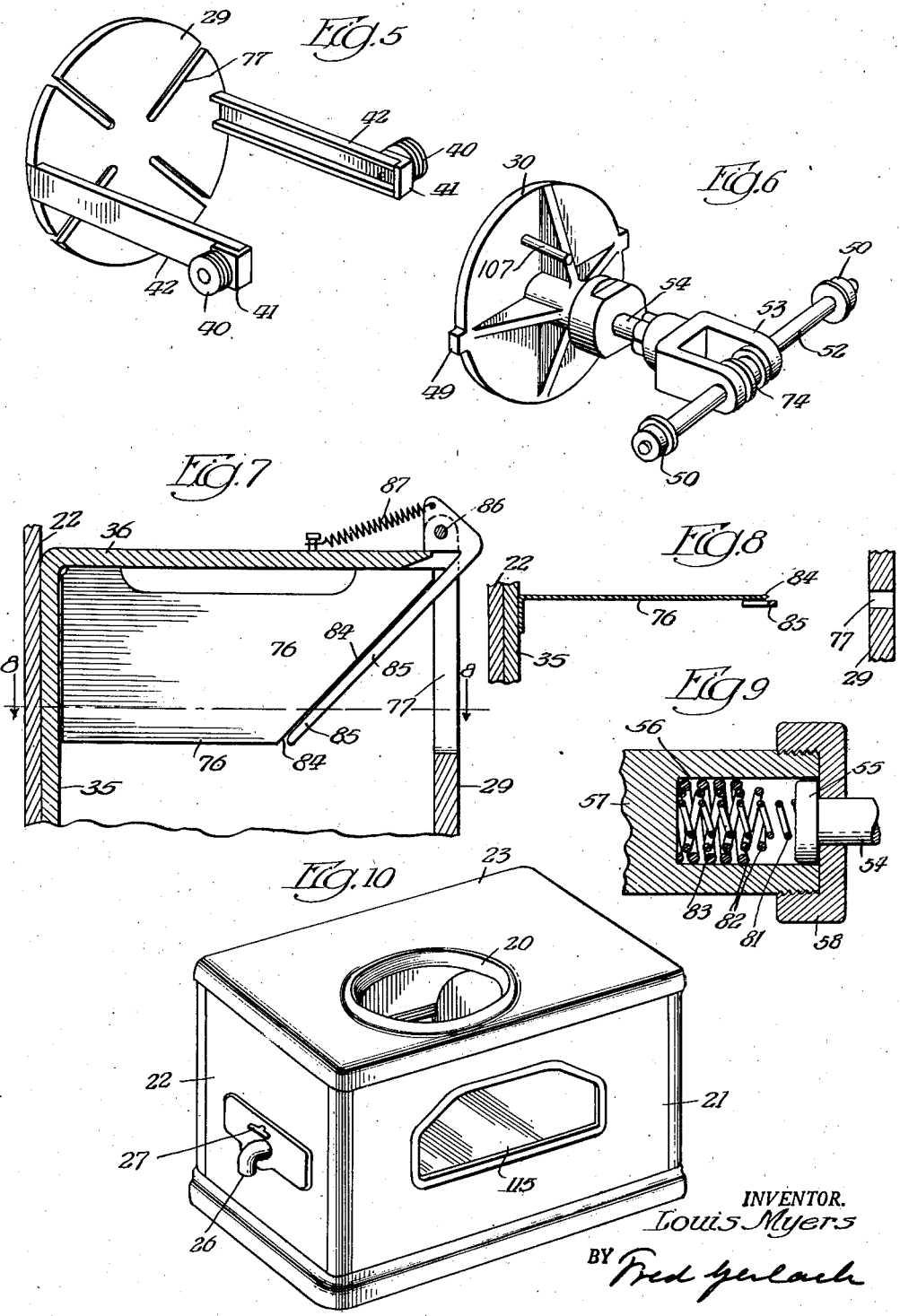

Patented Nov. 16, 1948

2,454,256

UNITED STATES PATENT OFFICE 2,454,256

JUICE EXTRACTOR

Louis Myers, Rockford, Ill.

Application January 11, 1945, Serial No. 572,333

15 Claims. (Cl. 100—41)

The invention relates to juice extractors.

One object of the invention is to provide an improved, automatically controlled power operated juice extractor.

Another object of the invention is to provide a juice extractor which comprises a pair of squeezer-members, which are operated to move the fruit into and squeeze it in a chamber and to withdraw the residue from the chamber for discharge from the extractor.

Another object of the invention is to provide an improved, automatically controlled juice extractor which includes means for severing the fruit into sections.

Another object of the invention is to provide improved, simple, and efficient power operated means for operating the squeezing elements.

A still further object of the invention is to provide an improved power-operated juice extractor which is automatically controlled by a fruit holder upon which the fruit is deposited preparatory to each squeezing operation.

Another object of the invention is to provide simple, and efficient automatic means for controlling the operation of an electric motor for operating the squeezer members and to discharge the residue of the fruit after the juice has been extracted.

Other objects of the invention will appear from the detailed description.

The invention consists in the several novel features hereinafter set forth and more particularly defined by claims at the conclusion hereof.

In the drawings:

Fig. 1 is a longitudinal section of a juice extractor embodying the invention, the operating parts being shown in position to receive the fruit.

Fig. 2 is a similar section illustrating the operating parts in the position assumed at the end of a squeezing stroke of the movable squeezer elements.

Fig. 3 is a horizontal section on line 3—3 of Fig. 1.

Fig. 4 is a vertical section taken on line 4—4 of Fig. 1.

Fig. 5 is a perspective of one of the squeezer elements.

Fig. 6 is a perspective of the other squeezer element.

Fig. 7 is a section illustrating one of the cutter blades and one of the spring pressed guides for centralizing the fruit relatively to the knives.

Fig. 8 is a section taken on line 8—8 of Fig. 7.

Fig. 9 is a detail illustrating the springs through which movement is imparted to one of the squeezer elements.

Fig. 10 is a perspective of the juice extractor.

The invention is exemplified in a juice extractor which comprises a substantially rectangular box or casing in which all of the operating mechanism is contained, and which is provided with an opening 20 in its top through which the fruit to be squeezed is deposited between the squeezing members. This casing comprises side walls 21, end walls 22, and a top wall 23. The extracted juices are discharged into a drawer 25 which is slidably mounted in the casing and provided with a spout 26 for delivering the juice into a receptacle, such as a tumbler. A latch 27 is adapted to removably hold the drawer 25 in the casing so that the drawer may be withdrawn for cleaning. The casing is open at its bottom for the discharge of the rind, pits or other residue after the juice has been extracted from the fruit, into a receptacle below the casing, such as a garbage can.

The squeezing mechanism comprises a vertically extending, horizontally slidable, substantially circular presser member 29 and a substantially circular coacting horizontally slidable presser member 30, between which the fruit to be squeezed is deposited. The fruit deposited between members 29 and 30 is supported by a trough or holder 32 which is pivotally movable to discharge the residue of the fruit after the juice has been extracted therefrom. The squeezing of the fruit is effected in a squeezing chamber 34 which is formed in a cup-shaped member which comprises an end-wall 35, and a cylindrical-wall 36 and is fixedly secured in the casing by screws 37. This cup-shaped member is adapted to fit around and receive the squeezer members 29 and 30, the latter being adapted to pass through the open inner end of the cup-shaped member. The squeezer members 29 and 30 are mounted for horizontal sliding movement into and out of the cup-shaped member. A series of radial knives 76 is fixedly secured in the cup-shaped member 36 and extends longitudinally from end to end of chamber 34. These knives are adapted to sever the fruit into sections as it travels longitudinally through chamber 34 before the completion of the squeezing operation. An elongated slot 39 is formed in the lower portion of the cylindrical-wall 36 through which the extracted juice discharges from the squeezing chamber into the drawer 25 where it will flow out of spout 26.

The squeezer member 29 is slidably guided in the cylindrical-wall 36 of the fixed cup-shaped member around the squeezing chamber 34 and is also guided for axial movement by a pair of rollers 40 which are journalled on lugs 41 which are secured to the inner ends of a pair of channel bars 42, the outer ends of which are fixedly secured to the squeezer member 29. Rollers 40 are adapted to travel in slots 44 which are formed in longitudinally and horizontally extending bars 45. Supporting bars 45 have one of their ends fixedly secured as at 46 to the cylindrical-wall 36 and their other ends fixedly secured as at 47 to one of the end-walls of the casing.

Squeezer member 30 is provided with laterally projecting lugs 49 which extend into and are adapted to slide in the inwardly facing channels of bars 42 which are secured to the squeezer member 29. Squeezer member 30 is also supported and guided horizontally by a pair of rollers 50 which are journaled on the outer ends of a cross shaft 52 and are adapted to travel in the slots 44 in the fixed supporting bars 45. Shaft 52 is operatively connected to squeezer member 30 by a fork 53 through which shaft 52 extends, and a stem 54 which is screw-threaded into fork 53 and provided with a head 55 which is slidable in a cylinder 56 which is formed in a hub 57 integral with compresser member 30. Springs are interposed between head 55 and the compresser member 30 for yieldingly operating member 30 as hereinafter described. A screw cap 58 through which stem 54 extends confines the head 55 in cylinder 56.

An electric motor 60 is provided to reciprocate the squeezer member 30 by power and its operation is automatically controlled to start when fruit is deposited onto the holder 32 and to stop upon retraction of member 30 after a squeezing operation. Motor 60 is fixedly mounted on a cross bar 61 which is fixedly secured in the casing. The mechanism for shifting squeezer member 30 by power from motor 60 comprises, a worm 62 on the shaft of said motor; a worm gear 63 engaged by worm 62; a pinion 64 driven by gear 63; a gear wheel 65 meshing with pinion 64 and suitably journaled on a stud 66 which is supported in a bracket 67 which is fixedly secured in the casing; a crank or wrist pin 69 on gear 65; and an arm or lever 70 provided with a channel 70′ into which pin 69 extends; a shaft 71a integral with arm 70 and pivotally supported on studs carried by the ends of the crank-case; and an arm 72 which is parallel with arm 70 and is provided at its upper end with a fork 73 which straddles a roller 74 on shaft 52 which is connected to squeezer member 30 as before described. During each complete revolution of gear wheel 65, wrist pin 69 will oscillate arms 70 and 72 to impart a squeezing stroke to the compresser member 30 and to retract it to the normal position as illustrated in Fig. 1. Squeezer member 29 is provided with radial slots 77 to permit the knives 76 to pass through said member during its reciprocation in the chamber 34. The squeezer member 29 is shifted into the squeezing chamber 34 by the fruit between said member and the power operated squeezer member 30. Squeezer member 30 is movable toward and independently of squeezer member 29 for engaging the fruit to shift it against the squeezer member 29. During such movement, lugs 49 on member 30 slide in the channels of bars 42. The movement of squeezer member 30 after the fruit has engaged member 29, will shift squeezer member 29 toward the outer end of squeezing chamber 34, until it strikes wall 35. Near the end of the retractile stroke of squeezer member 30, lugs 49 on member 30 will engage brackets 41 on bars 42 to retract squeezer member 29 to its normal position, illustrated in Fig. 1. The squeezer member 29 is adapted to be arrested by the end-wall 35 of the squeezing chamber 34. A series of three cumulatively acting coil springs 81, 82 and 83 are confined in cylinder 56 between the plunger member 55 and one end of said cylinder. After the squeezer member 29 is arrested in its outward movement by wall 35 the plunger head which is positively operated by power from motor 60 will, through said springs, exert the final pressure required for extracting the juice from the fruit. Knives 76 are provided with inclined cutting edges 84 which become effective as the fruit is forced outward in the squeezing chamber 34. A series of inclined arms 85 is associated with the edges 84 of each knife 76. Each arm is pivoted on 86 on the cup-shaped member and normally held by a spring 87 to engage said member and hold it yieldingly and normally in the position, illustrated in Fig. 7. These spring pressed guides centralize the fruit relatively to the knives as it is forced outwardly in the squeezing chamber.

The fruit holder 32 is pivotally supported on a rock shaft 90 which is journaled in a pair of hanger bars 91 which are fixedly secured to one of the bars 45, to swing downwardly to permit the residue of fruit between squeezer members 29 and 30 to be discharged through the open bottom of the casing and is also adapted to automatically control the operation of the electric motor 60 to start when fruit is deposited on the holder and to stop at the completion of the retractile stroke of the squeezer members. The holder 32 is normally pressed into its fruit holding position, as illustrated in Fig. 1, by a coil spring 93 between shaft 90 and one of the hanger bars 91, and has secured thereto a cam arm 94 which is engageable by a pin 96 on the arm 70 to rock the holder into its discharging position, illustrated in Fig. 2. The deposited fruit is adapted to depress the holder 32 against the force of spring 93 until arm 94 is arrested by a stop 97 on a lever 98 which is pivoted at 99 on the casing and is normally held out of the path of arm 94 by a spring 100. A pin 102 on the upper end of lever arm 70 is adapted to strike lever 98 to swing it into position to arrest arm 94 on the holder 32 while the squeezer members are in their fruit receiving positions. A latch lever 103 is provided for engaging arm 94 and retaining the holder 32 in its dumping position until the squeezing members are retracted substantially to normal position. Latch lever 103 is pivotally supported at 104 on a bracket 105 which is fixed in the casing and is provided with an abutment 106 which is engageable with bracket 105. The latch lever has a hook 109 and is weighted to swing by gravity so that said hook will swing into the path of the end of arm 94. Pin 107 normally holds lever 103 out of said path. Hook 109 on lever 103 is engageable with the free end of arm 94 to lock the holder in its dumping position as illustrated in Fig. 2.

An electric switch 111 is mounted in the casing and is connected to an electric circuit for the operation of motor 60. The switch comprises a member 112 which is normally spring pressed outwardly to close the circuit for the operation of the motor and is engageable by the arm 94 to open the circuit to stop the motor.

The operation of the juice extractor is as follows: Normally, the squeezer members and holder are in the position illustrated in Fig. 1, and the operating circuit for electric motor 60 will be held open by the engagement of arm 94 on the holder 32 with the spring pressed switch member 112. When the squeezer is to be operated, the user will deposit the fruit through opening 20. The fruit will drop onto the holder 32 between squeezer members 29 and 30. The weight of the fruit will be sufficient to shift holder 32 against the force of spring 93, which will shift arm 94 until it is arrested by stop 97 on lever 98. This movement of arm 94 will release switch member 112 to close the circuit for the operation of motor 60 which will then start the operation of the squeezer. The motor will commence to drive gear 65 and wrist pin 69 will commence to rock arm 70, shaft 70' and arm 72. During the initial movement, squeezer member 30 will move the fruit to engage squeezer member 29 and the fruit will be grasped between said members. The pin 102 on arm 72 will then release latch lever 98 and spring 100 will shift said lever into the position illustrated in Fig. 2 to release arm 94 on the holder. During the continuation of the movement of squeezer member 30, the fruit and squeezer member 29 will be forced into the squeezing chamber 34 and the knives 76 will sever the fruit into sections. The movement of the squeezer members with the fruit therebetween is continued until squeezer member 29 is arrested by wall 35. Movement of squeezer member 30 will be continued until it is squeezed between the squeezer members to extract the juice which will be discharged through the slot 39 into the drawer 25. After squeezer member 29 is arrested by wall 34, the plunger 55 will act progressively through the cumulative pressure of springs 81, 82 and 83 to express the juice from the fruit. During the commencement of the operative stroke of squeezer member 30, pin 107 will release latch lever 103 and permit it to swing into position to latch the end of arm 94. During the operative stroke of squeezer member 30, pin 96 will engage cam arm 94 and swing said arm and the holder 32 into the position illustrated in Fig. 2, so that the holder will be locked in its dumping position. The pin 96 rides off the cam-portion of arm 94 at a shoulder 94ᵃ after said arm is caught by latch 103, to permit arm 72 to continue its squeezing stroke, and to permit pin 96 to pass under said cam-portion during the retractile stroke of arm 70. The continuing movement of wrist pin 69 after the juice has been extracted, will retract the squeezer member 30 until lugs 49 engage the brackets 41 on channel bars 42, and then lugs 49 will retract the squeezer member 29 out of the squeezing chamber 34 and carry the rind and residue of the fruit out of the chamber 34 so they will be discharged downwardly and pass over the downwardly tilted holder 32. At the end of the retractile stroke of squeezer member 30, pin 107 will strike latch lever 103 to release arm 94 and spring 93 will shift holder 32 into its normal fruit-retaining position. Adjacent the end of the retractile stroke of arm 72, pin 102 thereon will strike latch lever 98 and shift it against the force of spring 100 into the latching position illustrated in Fig. 1. As the arm 72 reaches the end of its retractile stroke, arm 94 engages the member 112 of switch 111 to open the motor operating circuit and automatically stop the motor. During each operation, wheel 65 will travel one complete revolution for reciprocating the squeezer members and the automatic control means for the motor.

The drawer 25 can be conveniently withdrawn to be cleaned to prevent accumulation of pulp discharged into it with the juice. The casing may be provided with a window 115 through which the operation of the holder 32 may be observed.

The invention exemplifies a fruit squeezer in which the squeezer members operate horizontally, are relatively movable, one of the squeezer members is shifted from the other through the fruit, the final squeezing is effected by spring pressure applied to one of the members and the fruit-residue is withdrawn from the squeezing chamber. The invention also exemplifies an extractor which comprises simple motor-operated unit-directionally operated gearing for operating the squeezer members and means for automatically controlling the operation of the motor. The invention also exemplifies a juice extractor in which the deposit of the fruit onto the holder automatically controls the starting of the motor and means for automatically controlling the holder for discharging the residue of the fruit from the squeezer members. The invention also exemplifies an automatically controlled motor for operating the squeezer members and knives for cutting the fruit into sections before the completion of the squeezing operation.

Having thus described the invention, what I claim as new and desire to secure by Letters Patent is:

1. In a juice extractor, the combination of a casing having a squeezing chamber therein, a pair of squeezer members respectively adapted to move the fruit into and squeeze the fruit in said chamber and to withdraw the fruit-residue from the chamber, means for guiding the squeezer members, the members being relatively movable, one of said members being movable by the other by fruit interposed between them and retractable for moving the fruit residue out of the chamber, and mechanism for reciprocating said other member to move the fruit into said chamber, and in co-action with said one member to express the juice from the fruit therein and withdraw the one member to force the fruit-residue from said chamber.

2. In a juice extractor, the combination of a casing having a horizontally extending squeezing chamber therein, a pair of squeezer members respectively adapted to move the fruit horizontally into and squeeze the fruit in said chamber and to withdraw the fruit-residue from the chamber, means for guiding the squeezer members, the members being relatively movable, one of said members being movable in one direction in the chamber by the other member by fruit interposed between them and retractable for moving the fruit-residue out of the chamber, a holder for fruit between the squeezer members, and mechanism for reciprocating said other member to move the fruit from the holder into said chamber, and in co-action with said one member to express the juice from the fruit therein and withdraw the one member to force the fruit-residue from said chamber.

3. In a juice extractor, the combination of a casing having a horizontally extending squeezing chamber therein, a pair of squeezer members respectively adapted to move the fruit horizontally into and squeeze the fruit in said chamber and to withdraw the fruit-residue from the chamber, means for guiding the squeezer members, the members being relatively movable, one of said members being movable in one direction in the chamber by the other by fruit interposed between them and being retractable by the other member for moving the fruit-residue out of the chamber, a holder for fruit between the squeezer members, means for arresting said one member in the chamber, and mechanism for reciprocating said other member to move the fruit from the holder into said chamber, and in co-action with said one member while it is stopped by said arresting means, to express the juice from the fruit therein and withdraw the one member to force the fruit-residue from said chamber.

4. In a juice extractor, the combination of a casing having a squeezing chamber therein, a pair of squeezer members respectively adapted to move the fruit into and squeeze the fruit in said chamber and to withdraw the fruit-residue from the chamber, means for guiding the squeezer members, the members being relatively movable, one of said members being movable by the other by fruit interposed between them and retractable for moving the fruit residue out of the chamber, a holder for fruit between the squeezer members, power operated mechanism for reciprocating said other member to move the fruit from the holder into said chamber, and in co-action with said one member to express the juice from the fruit therein and withdraw the one member to force the fruit-residue from said chamber, said mechanism including spring-means through which the operative stroke is imparted to said other member.

5. In a juice extractor, the combination of a casing having a squeezing chamber therein, squeezer means adapted to move the fruit into and squeeze the fruit in said chamber and to withdraw the fruit-residue from the chamber, a holder for fruit for engagement by said squeezer means outside of the chamber, movable into and out of fruit holding position, mechanism for reciprocating the squeezer means to move the fruit from the holder into said chamber, express the juice from the fruit therein and withdraw the residue from said chamber, and means for shifting the holder out of fruit-holding position for the discharge of the withdrawn residue and into fruit holding position.

6. In a juice extractor, the combination of a casing having a squeezing chamber therein, squeezer means adapted to move the fruit into and squeeze the fruit in said chamber and to withdraw the fruit-residue from the chamber, a holder for fruit for engagement by the squeezer means, movable into and out of fruit-holding position, mechanism for reciprocating the squeezer means to move the fruit from the holder into said chamber, express the juice from the fruit therein and withdraw the residue from the chamber, and means automatically controlled by the operation of said mechanism for shifting the holder out of fruit-holding position for the discharge of the withdrawn residue and into fruit holding position.

7. In a juice extractor, the combination of a casing having a squeezing chamber therein, a pair of squeezer members respectively adapted to move the fruit horizontally into and squeeze the fruit in said chamber and to withdraw the fruit-residue from the chamber, one of said members being movable by the other by the fruit and retractable by said other member, a holder for supporting fruit between the squeezer members when they are separated, movable into and out of fruit-holding position, power-operated mechanism for reciprocating said other squeezer member to move the fruit from the holder into said chamber, and express the juice from the fruit therein and in co-action with said one member to withdraw the residue from the chamber, and means automatically controlled by said mechanism for shifting the holder out of fruit-holding position for the discharge of the withdrawn residue and into fruit-holding position.

8. In a juice extractor, the combination of a casing having a horizontally extending squeezing chamber therein, a pair of squeezer members respectively adapted to move the fruit into and squeeze the fruit in said chamber and to withdraw the fruit-residue from the chamber, means for horizontally guiding the squeezer members, the members being relatively movable, one of said members being movable by the other by fruit interposed between them, means for retracting said one member, means for holding fruit between the squeezer members, stationary knives in the chamber for cutting the fruit, and mechanism for reciprocating said other member to move the fruit from the holding means into said chamber, and in co-action with said one member to express the juice from the fruit therein, and withdraw the one member to force the severed fruit-residue from said chamber.

9. In a juice extractor, the combination of a casing having a horizontally extending squeezing chamber therein, a pair of squeezer members respectively adapted to move the fruit into and squeeze the fruit in said chamber and to withdraw the fruit-residue from the chamber, means for horizontally guiding the squeezer members, the members being relatively movable, one of said members being movable by the other by fruit interposed between them, means for retracting said one member, means for holding fruit between the squeezer members, a series of spring-pressed guides in the chamber for centralizing the fruit, mechanism for reciprocating said other member to move the fruit from the holding-means into said chamber, and in co-action with said one member to express the juice from the fruit therein, and withdraw the one member to force the severed fruit-residue from said chamber.

10. In a juice extractor, the combination of a casing having a horizontally extending squeezing chamber therein, a pair of squeezer members respectively adapted to move the fruit into and squeeze the fruit in said chamber and to withdraw the fruit-residue from the chamber, means for horizontally guiding the squeezer members, the members being relatively movable, one of said members being movable by the other by fruit interposed between them, means for retracting said one member, means for holding fruit between the squeezer members, stationary knives in the chamber for cutting the fruit, a series of spring-pressed guides for centralizing the fruit in the chamber, and mechanism for reciprocating said other member to move the fruit from the holder into said chamber, and in coaction with said one member to express the juice from the fruit therein and withdraw the one member to force the severed fruit-residue from said chamber.

11. In a juice extractor, the combination of a casing having a squeezing chamber therein, squeezer means, means for guiding the squeezer means for substantially horizontal sliding movement in the chamber, a holder under the squeezer for supporting fruit, and movably supported so it will be shifted when fruit is deposited thereon, mechanism comprising an electric motor for moving the squeezer means into said chamber to squeeze the fruit, and means controlled by the movement of the fruit holder by the fruit for controlling the starting of the motor.

12. In a juice extractor, the combination of a casing having a squeezing chamber therein, squeezer means, means for guiding the squeezer means for substantially horizontal sliding movement in the chamber, a pivotally supported holder under the squeezer means for supporting fruit and adapted to be shifted when fruit is deposited thereon, a spring for shifting the holder into fruit-receiving position, mechanism comprising an electric motor for moving the squeezer means into said chamber to squeeze the fruit, and means controlled by the movement of the holder by the fruit for controlling the starting of the motor.

13. In a juice extractor, the combination of a casing having a squeezing chamber therein, squeezer means, means for guiding the squeezer means for substantially horizontal sliding movement in the chamber, a pivotally supported holder under the squeezer means for supporting fruit and adapted to be shifted when fruit is deposited thereon, spring means for shifting the holder into fruit-holding position, mechanism comprising an electric motor for moving the squeezer means into said chamber to squeeze the fruit, means controlled by the movement of the holder by the fruit for automatically controlling the starting of the motor, automatic means for shifting the holder into and latching it in non-holding position, and means controlled by the movement of the squeezer means for releasing the holder and automatically stopping the motor.

14. In a juice extractor, the combination of a casing having a squeezer chamber therein, squeezer means, means for guiding the squeezer means for substantially horizontal sliding movement in the casing, mechanism for reciprocating the squeezer means for expressing juice from the fruit comprising an electric motor, a wheel unidirectionally driven by the motor, a crank element on the wheel, and an oscillating arm operated by the crank element and connected to impart predetermined squeezing and retractile strokes to the squeezer means, means controlled by the deposit of fruit into the casing for automatically starting the motor, and automatic means for stopping the motor upon completion of a revolution of the wheel.

15. In a juice extractor, the combination of a casing having a squeezing chamber therein, squeezer means, means for guiding the squeezer means for substantially horizontal sliding movement in the casing, a holder for supporting fruit in position to be shifted into the chamber by the squeezer means and mounted for pivotal movement by the fruit, mechanism comprising an electric motor for moving the squeezer means into and out of the chamber, a switch for controlling the motor, means controlled by said holder for controlling the switch to start the motor, means for arresting the holder when it is shifted by the fruit, means controlled by said mechanism for releasing the arresting means, and means controlled by said mechanism for shifting the holder from and to its fruit-holding position and operating the switch to stop the motor.

LOUIS MYERS.

REFERENCES CITED

The following references are of record in the file of this patent:

UNITED STATES PATENTS

| Number | Name | Date |
| --- | --- | --- |
| 1,180,959 | Turner | Apr. 25, 1916 |
| 2,363,798 | McCulloch | Nov. 28, 1944 |